United States Patent [19]

Grau

[11] Patent Number: 4,737,938

[45] Date of Patent: Apr. 12, 1988

[54] SEISMIC PROSPECTING METHOD USING VEHICLES MOVING IN OPPOSITE DIRECTIONS

[75] Inventor: Gérard Grau, Saint Germain en Laye, France

[73] Assignee: Institut Francais du Petrole, France

[21] Appl. No.: 829,240

[22] Filed: Feb. 14, 1986

[30] Foreign Application Priority Data

Feb. 14, 1985 [FR] France ................................ 85 02286

[51] Int. Cl.⁴ ........................ G01V 1/38; G01V 1/00
[52] U.S. Cl. ........................................ 367/21; 367/56; 181/111; 181/112
[58] Field of Search ............... 181/101, 108, 110, 111, 181/112, 139, 140, 141; 367/14, 16, 17, 18, 19, 20, 56, 57, 58, 106, 117, 130, 141, 137, 153, 154, 21; 114/242

[56] References Cited

U.S. PATENT DOCUMENTS

| | | | |
|---|---|---|---|
| 3,786,408 | 1/1974 | Jenkinson et al. | 367/56 X |
| 3,806,863 | 4/1974 | Tilley et al. | 367/21 |
| 3,890,593 | 6/1975 | Davis | 367/56 X |
| 3,906,352 | 9/1975 | Parker | 367/19 |
| 4,290,124 | 9/1981 | Cole | 367/18 |
| 4,437,176 | 3/1984 | Mack | 367/56 X |

OTHER PUBLICATIONS

GECO Brochure, 3D Marine Seismics Two Boat Operation 6/85.
Western Geophysical Brochure, Coordinated Two-Vessel Surveying, 1984, pp. 1-6.

Primary Examiner—Deborah L. Kyle
Assistant Examiner—Brian S. Steinberger
Attorney, Agent, or Firm—Antonelli, Terry & Wands

[57] ABSTRACT

A seismic prospecting method comprising the use of at least two vehicles for moving an acoustic wave emission assembly and a reception assembly such as a seismic streamer. The method consists in performing successive cycles of emission of acoustic waves, of reception and of recording of the acoustic waves coming from reflecting interfaces of the subsoil and combining the recording so as to provide multiple coverage. The vehicles follow paths such that the angle formed by the respective advancing directions remains greater than or equal to 90° in absolute value.

10 Claims, 3 Drawing Sheets

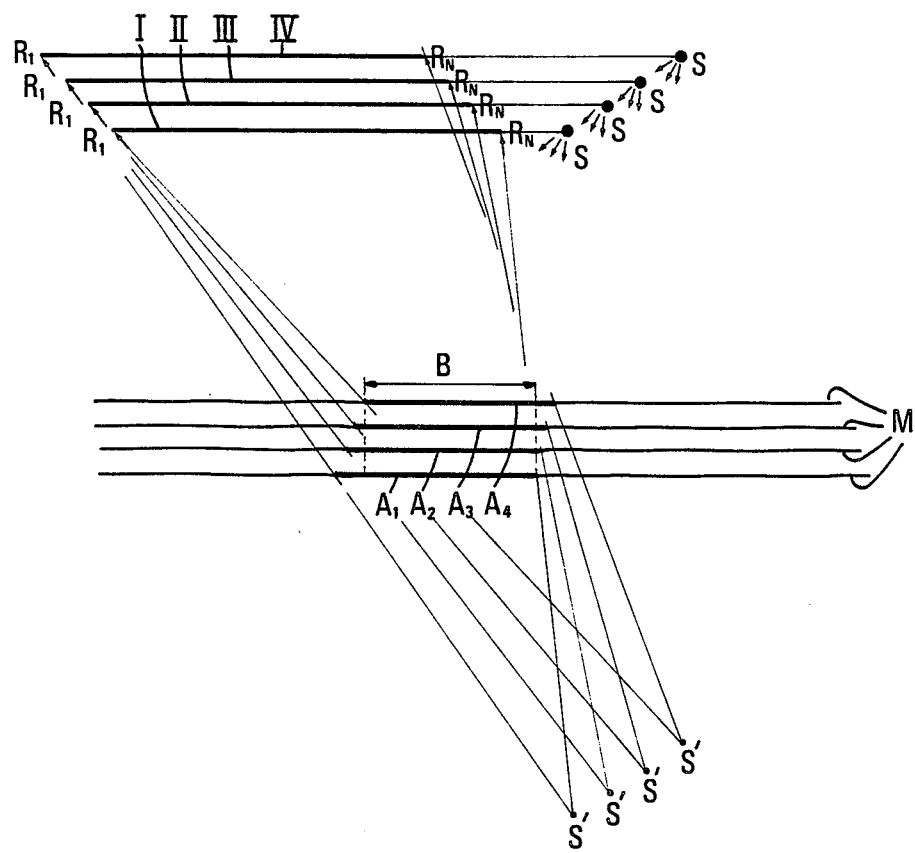
FIG.5
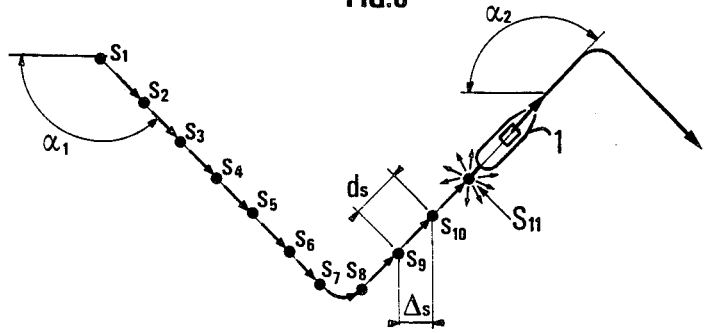
FIG.6
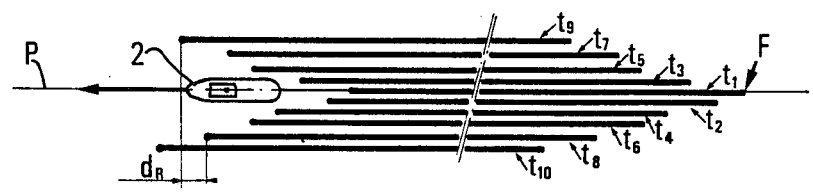

SEISMIC PROSPECTING METHOD USING VEHICLES MOVING IN OPPOSITE DIRECTIONS

BACKGROUND OF THE INVENTION

1. Field of the Invention

The present invention provides a new method of seismic prospecting usable in particular for offshore operations.

2. Description of the Prior Art

Seismic prospecting at sea is generally achieved by towing behind a ship a seismic source adapted for intermittently emitting seismic pulses and a reception assembly or seismic streamer adapted for picking up the acoustic signals reflected or refracted by the different layers of the subsoil in response to the acoustic pulses. It is general practice to tow the source-streamer assembly as if these two elements were rigidly joined together (except for the lateral drift of the streamer).

The signals picked up are sent to a central recording facility on the ship and seismic sections are formed from the recordings of the profiles, after effecting processing and various corrections.

A conventional processing method consists in forming multiple plots of the different points of the horizon or surfaces reflecting the seismic waves.

A seismic streamer comprises a number N of receivers each formed by a sensor or more generally by a plurality of interconnected sensors whose combined signals form a distinct plot on recording. The N receivers are spaced apart along the seismic streamer with a constant spacing e.

With the seismic streamer and the source towed along the profile to be explored, at each of the positions of a succession of different positions of the profile a seismic emission and reception cycle is carried out and for each of them N distinct plots are recorded. Then, from the recorded plots obtained after the succession of cycles, those plots are selected which correspond to reflections from identical mirror points. After correction of the travel time differences of the waves due to differences in slant of the acoustic rays, these plots are combined so as to obtain by a redundancy effect a greater sharpness in the representation of the different reflecting surfaces.

The maximum multiple coverage order; i.e. the maximum number of plots which it is possible to combine, is equal to the number N of receivers in the streamer. It can only be attained if, from one firing to the next, the emission and reception device has only advanced a distance equal to half the spacing e between receivers, because the emission points and the corresponding reception points, relative to fixed reflecting points, move apart symmetrically from each other, a movement of the emission points causing an equal movement, but in the opposite direction, of the reception points.

For the same reflecting point, the distance which separates the firing point and sensor increases then from one firing to another by twice the distance which the source-streamer assembly has covered during each emission cycle. If the number N is too great, this cannot be achieved in practice because of the time required for recording all the useful echoes and because of the technical and economic constraints which preclude sailing below a certain minimum speed of a few knots. Reflecting points spaced apart by an interval e/2 may be restored, but with a smaller degree of coverage.

The seismic prospecting method of the invention increases very substantially the multiple coverage order which it is possible to obtain with a given streamer or maintains it at a high level while using one or more much shorter streamers.

SUMMARY OF THE INVENTION

The invention is characterized by the performance of a plurality of emission and reception cycles each formed by a step of emitting acoustic waves from at least one acoustic wave source initiated at each position of a series of separate successive positions, a step of receiving the acoustic waves reflected back by the different reflecting layers of the subsoil by means of at least one movable reception device including an assembly of separate receivers and a step of recording the acoustic waves received and combining the recordings relative to the reflections from identical positions of said layers so as to obtain mulitple coverage thereof.

It is characterized in that the different cycles are realized by associating the source and the reception device with vehicles moving along paths such that the angle formed by their respective advancing directions is greater than or equal to 90° in absolute value.

The moving speeds of the source and the reception device along their respective paths are chosen preferably to be different from each other and the difference between their speeds as well as the time interval between the emission and reception cycles are determined, for example, so that the ratio between the movements of the reflection points from the reflecting layers, between any two successive cycles and the spacing between the receivers of the reception device correspond to a preselected degree of multiple coverage.

BRIEF DESCRIPTION OF THE DRAWINGS

Other features and advantages of the method of the invention will be clear from the following description of several embodiments given by way of non limitative examples, with reference to the accompanying drawings in which:

FIG. 5 is similar to FIG. 2 and applies in the case where, in accordance with the method of the invention, the emission device and the reception device move apart from each other in opposite directions. The same conventions have been used for the representation.

FIG. 6 shows an implementation of the method for combining a high multiple coverage order and a three dimensional representation of the subsoil. For the sake of clarity, the respective positions of the seismic streamer corresponding to successive firing times are also shown with lateral shifts on each side of the real path followed by the ship which tows it.

DESCRIPTION OF THE PREFERRED EMBODIMENTS

Figure 1:
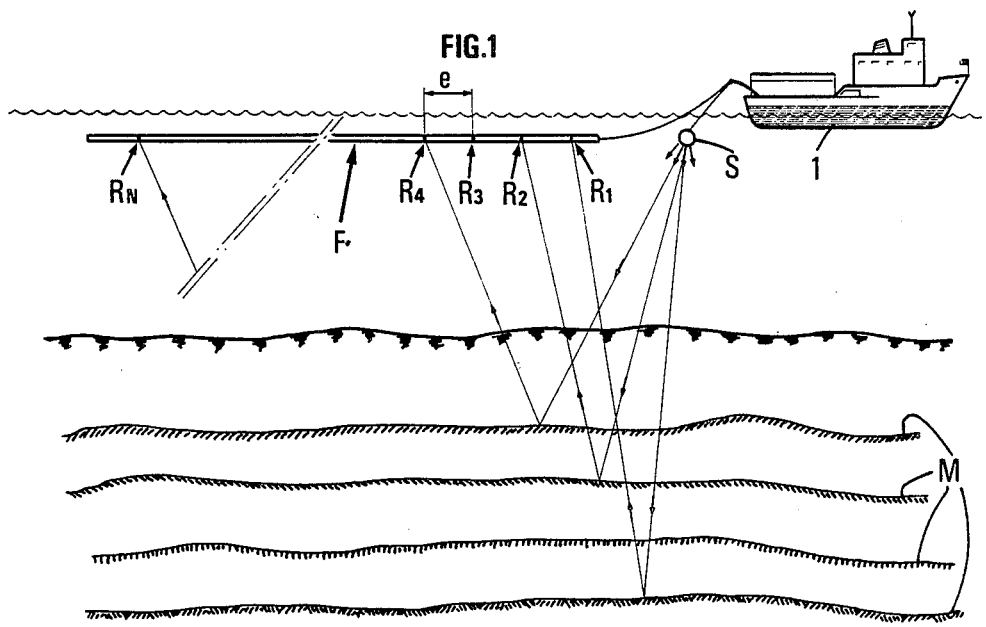
FIG. 1 shows an emission and reception assembly towed by a ship for implementing known seismic prospecting methods.

A traditional emission-reception system comprises (FIG. 1) a seismic wave emitting source S and a reception assembly or seismic streamer F comprising a plurality of seismic receiver $R_1$, $R_2$, $R_3$, $R_4$ ... $R_N$ spaced apart at even intervals e along said assembly. The source and the reception assembly are towed, in the case of FIG. 1, by the same ship 1 moving continuously along a seismic profile to be studied. Source S is activated at regular intervals. The acoustic wave which it generates will be reflected from different reflecting interfaces of the underwater subsoil and are picked up by the different receivers of the seismic streamer. The signals generated by the receivers in response to the seismic waves are fed to a recording system on the ship for forming the recording plots.

A well known process for improving the readability of the recordings consists in providing a multiple coverage of the different parts of the different underlying interfaces by combining together the recording plots obtained during successive emission-reception cycles and corresponding to reflections from any identical part of one of the different reflecting interfaces.

In position I (FIG. 2) of the emission-reception system the reflections picked up by receivers $R_1$ to $R_N$ of the streamer, in response to an emission from source S (or its image S'), come from a part $A_1$ thereof. In the respective positions II, III, IV of the emission-reception system, shifted with respect to each other because of the advance of the ship, the parts of the same interface M reflecting the seismic energy picked up by the different receivers $R_1$ to $R_N$ of the flute will be respectively $A_2$, $A_3$, $A_4$. These different parts overlap partially. The common part B of the interface contributes to four sets of successive recordings.

Figure 3:
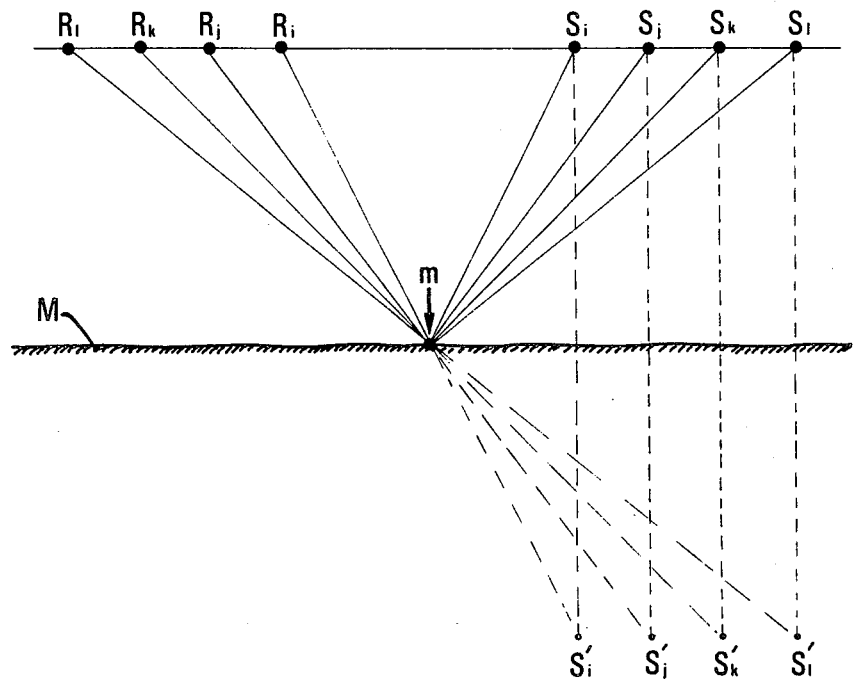
FIG. 3 shows the arrangement of pairs of emission and reception points of the acoustic waves associated with fixed reflection points, on a given mirror.

If the same point m of interface M reflects back acoustic waves emitted by source S at four points $S_i$, $S_j$, $S_k$, $S_l$ of this seismic profile (FIG. 3) and the reflected waves are received during four different emission-reception cycles by the receivers $R_i$, $R_j$, $R_k$, $R_l$ of the receiving assembly, the corresponding recording plots are combined after being suitably shifted in time with respect to each other so as to take into account the different slants of the acoustic paths passing through the same reflecting point.

The degree of coverage or overlapping depends, as is known, on the advancing speed of the ship and/or on the time interval between successive firings. The minimum value which it is possible to obtain by traditional offshore seismic prospecting methods is equal to the number N of receivers of the streamer. It corresponds to the case where the same point m of a reflecting interface contributes to the acoustic energy received successively by the N receivers of the seismic streamer during N successive cycles.

As was seen, for technical or economic reasons it is impossible to obtain the maximum degree of coverage using a traditional emission-reception system towed by one ship. In a practical case where a seismic streamer is used comprising 192 separate receivers whose spacing e is equal to 12.5 meters, which is towed, along with a source S, by a ship advancing at a speed of 5 knots, and with the time intervals between firings equal to 10 seconds, the movements $d_S$ of the source $d_M$, of the image point of the source and $d_R$ of the receivers between two seismic firings are equal to 25 meters. Different points of the reflecting interface may be restored spaced apart by e/2, i.e. 6.25 meters, but the order of coverage will be equal to 48. Under these conditions of use with such a seismic streamer four coverages of the order of 48 may be obtained.

The overlap factor f is the ratio of the movement $d_M$ of the reflection points between two firings to the half space between receivers $$f = \frac{d_M}{e/2} \tag{1}$$

The degree of coverage c which it is possible to obtain with a seismic streamer comprising N receivers may be expressed by the relationship:

$$c = N/f \tag{2}$$

If we consider that the distance $d_M$ is the half sum of the movements $d_S$ and $d_R$, the factor f is further expressed by the relationship:

$$f = \frac{d_S + d_R}{e} \tag{3}$$

In the practical case mentioned above, the factor f is equal to 4. Its minimum value $f_o$ in the impracticable case if N is large using traditional methods, where the order of mulitiple coverage is equal to the number of recording plots, would be equal to 1.

With the method of the invention, f can not only be given a value equal to the minimum value $f_o$, but the value of f may even be brought at will below the value $f_o$, that is to say making the degree of multiple coverage equal to or greater than the number of receivers in the streamer.

Figure 4:
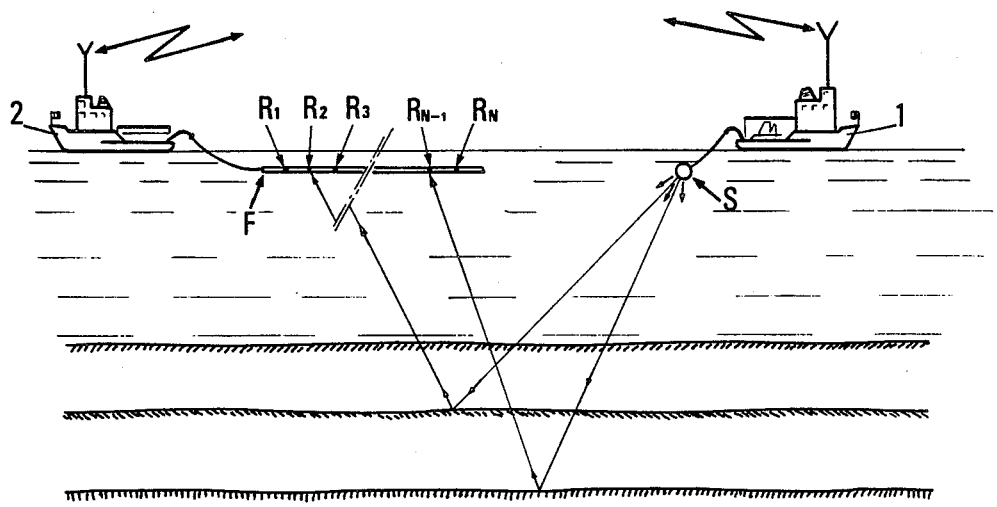
FIG. 4 shows an emission and reception assembly associated with two separate vehicles for implementing the method of the invention.

For this, towing of the source is effected separately from that of the reception assembly. Source S (FIG. 4) is towed for example by a ship 1 and the reception assembly F is towed by another ship 2 sailing in an opposite direction to the first one.

The movement $d_R$ of the reception assembly is subtracted from that $d_S$ of the source and consequently their sum $(d_S + d_R)$ may, if required, be made less than the spacing e between receivers. With an appropriate choice of the speeds of movement of the two vehicles a given overlap factor f may be obtained.

Figure 2:
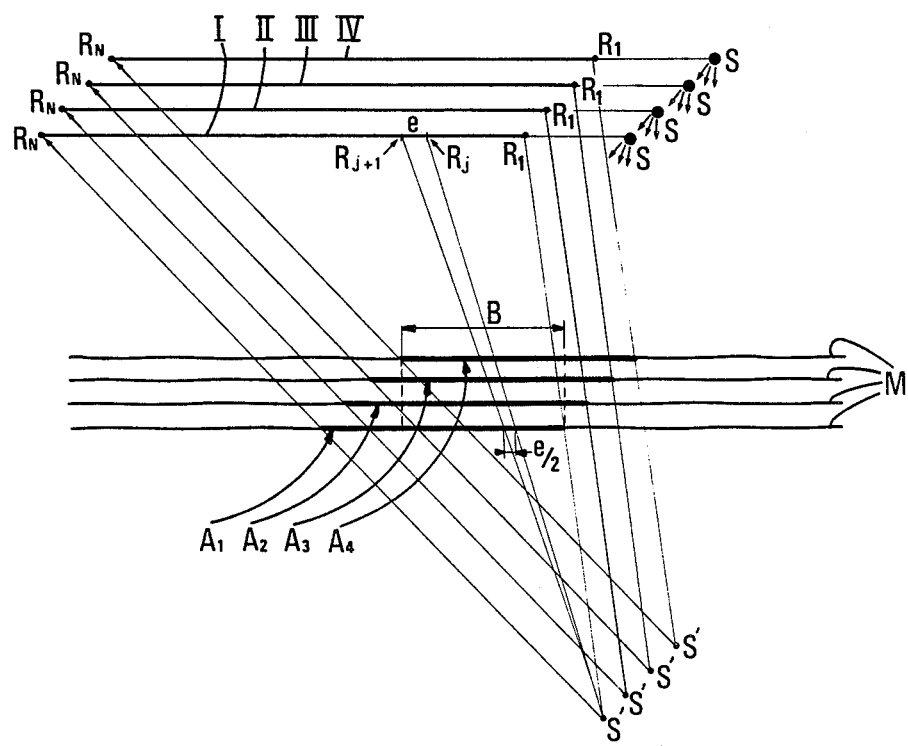
FIG. 2 shows schematically successive arrangements of an emission and reception assembly, of the parts of reflecting interfaces of the subsoil associated respectively with the different arrangements of said assembly and the partial overlapping of these parts, in the usual case where the emission and reception assembly is towed by a single ship. To facilitate understanding, the successive positions of the reception assembly or seismic streamer at successive firing times and the mirror parts participating for each of them in the reflections picked up by the receivers have been shown one above the other.

It can be seen in FIG. 5 that the four parts $A_1$, $A_2$, $A_3$, $A_4$ of the same mirror M reflecting the acoustic energy emitted by the same source S at four different positions, and picked up by the receivers $R_1$ to $R_N$ of the same streamer travelling in the opposite direction, at four positions I, II, III, IV thereof, are less offset with respect to each other than the corresponding parts of FIG. 2 and consequently the degree of overlap obtained is greater.

To come back to the example already mentioned, an order of coverage of 192 may be obtained by making $d_R$ equal to $-12.5$ meters, that is to say by having the boat towing the streamer go in the opposite direction to the boat towing the source (shot firing boat) at a speed of 1.25 m/s corresponding substantially to 2.5 knots.

With the method of the invention the speed of the shot firing boat may be increased so as to reduce operating costs, while increasing correspondingly the speed at which the ship towing the streamer moves away. Returning to the same example, the speed of the shot firing boat may be increased to 7.5 knots while causing the other boat to sail at 5 knots in the opposite direction.

In all cases, the points m of the mirrors move in the same direction as this latter. For the sake of convenience, f is given a value such that its inverse is an integer.

With this method, a high overlap order may also be maintained while using streamers comprising a smaller number of receivers, by using the redundancy of the seismic information obtained with a factor f very much less than unity. In the preceding example, three coverages of order 48 at a pitch of $d_M=e/6$ may be obtained with a streamer comprising 48 receivers spaced apart by 25 meters, by moving the source by 27 meters between shots which corresponds to a speed of 6 knots and a time interval of 9 seconds, and by moving the streamer in the opposite direction at 4.15 knots ($d_R=-18.7$ m). With these three coverages a signal to noise ratio S/B may be obtained as high as coverage of the order of 100 to 150 under good working conditions.

The use of such streamers comprising a smaller number of receivers is more economical and makes it easier to implement one possible embodiment of the method in which several streamers are used and towed by several remote controlled boats.

One of them moves away from the shot firing boat while towing a seismic streamer which supplies recordings. At the same time, a boat (or several others) brings close to the shot firing boat one or more seismic streamers which have served during previous emission-reception cycles and which maneuvers have led beyond their practical range of use.

In another embodiment, a ship is used for towing the seismic streamer comprising a large number of receivers and several boats for towing each in its turn a seismic source in the opposite direction and then bringing it back close to the ship.

The seismic sources used in this case may be relatively less powerful, for the shot firing boats may be considerably speeded up so as to increase the equivalent degree of coverage. These sources may for example be vibrators.

In the practical example already considered, with a seismic streamer comprising 96 receivers spaced apart by 12.5 meters, towed by a ship sailing at a speed of 5 knots with a time interval of 10 seconds between two shot firings which makes $d_R$ equal to $-25$ meters, a double coverage of the order of 96 may be obtained if the shot firing boat travels at 2.5 knots in the opposite direction ($d_S$ is equal to 12.5 meters and $d_M$ has the same value as $-e/4$). The order of the two coverages may be brought to 192 if the shot firing boat advances at 3.75 knots and the ship tows a streamer comprising 192 receivers ($d_S$ is equal here to 18.75 meters and $d_M$ also has the same value as $-e/4$).

The fact of being able to use relatively small sources facilitates implementation of the emission system. Powerful sources are generally formed of a plurality of emission units initiated simultaneously or in sequence, so as to obtain a resultant seismic wave of particular form or signature and it is known that it is often difficult to obtain good repeatability because of the swell and waves for example which modify the position in the water of the elementary sources. In this respect, the variations of attitude of single sources or small groups of sources are more easy to correct.

In another embodiment (FIG. 6), the ship 2 towing the seismic streamer F follows a rectilinear path P at a constant speed. The different positions of the streamer shown correspond to ten successive times $t_1, t_2 \ldots t_{10}$ at which the seismic source is initiated (the lateral deviations are shown here it will be recalled for the sake of clearness of the drawings). The advancing pitch $d_R$ of the receivers between two successive shot firings is constant.

The boat 1 which tows the seismic source moves in the opposite direction along a path zig-zagging on each side of a fixed direction which may be parallel to the route followed by the ship 2 for example. The points $s_1, s_2 \ldots s_{10}$ represent the successive positions of the source at ten times $t_1$ to $t_{10}$. The angle $\alpha$ between the advancing directions of the two boats 1 and 2 takes alternately two values $\alpha_1$ and $\alpha_2$ greater than or equal to 90° in absolute value.

The number of advancing pitches of the shot firing boat 1 between two successive turns depends on the desired lateral deviation and of course on its maneuverability.

For calculating the degree of multiple coverage c (cf. relationship 2) we come back to the preceding case of parallel and opposite paths, considering no longer the advancing pitch $d_S$ of the source but its projection on the advancing direction P.

Without departing from the scope of the invention, the shot firing boat may more generally follow any path alternately on one side and on the other of a fixed direction. This path may in particular have a square or crehellate shape. The method may be more readily put into practice if the system for conducting seismic operations described in the U.S. application Ser. No. 805,785, filed Dec. 6, 1985, is used. This system comprises the use of one or more vehicles of low tonnage such as motors launches, these vehicles being remote controlled from a main ship by means of a radio control assembly combined with a navigation device adapted for determining the position of the ship and the relative position of the vehicles with respect thereto. The seismic data picked up by the receivers of the seismic streamer are fed to a central recording laboratory installed on the ship through a high flow-rate transmission assembly.

Depending on the cases, the remote controlled launches may be used within the scope of the present method for towing one or more seismic sources or else one or more reception assemblies.

The embodiments described above are of course in no wise limitative. The method may be just as well put into practice using piloted boats.

Without departing from the scope of the present invention at least two land vehicles may be used for moving the parts of an emission and reception device away from each other.

What is claimed is:

1. A seismic prospecting method for use in particular for offshore seismic prospecting, comprising the steps of:
    performing successively a plurality of emission and reception cycles each including emitting acoustic waves by means of at least one source of acoustic waves initiated at each position of a series of separate successive positions, and receiving the acoustic waves reflected by different reflecting layers of subsoil by means of at least one movable reception device having an assembly of separate receivers spaced apart from one another;

recording said received acoustic waves; and combining recordings of reflections from identical positions on said reflecting layers, so as to obtain multiple coverage thereof at a degree depending on the number of times of said reflections from an identical part on said reflecting layers;

said successive emission and reception cycles being achieved by associating said source with a first vehicle and said reception device with at least one second vehicle, and moving said first and second vehicles in opposite directions at unequal speeds along different paths with the angle formed by the advancing direction of a vehicle associated with said source and the advancing direction of a vehicle associated with said reception device being greater than 90°, whereby components of said advancing directions are directed diametrically opposite to each other.

2. The method as claimed in claim 1, wherein the difference between said speeds of said vehicles and the time interval between successive emission and reception cycles are determined so that the ratio between the spacing of reflection positions on said reflecting layers, which spacing depends on said speeds and the time interval between any two successive cycles, and the spacing between said separate receivers of said reception device corresponds to a predetermined degree of multiple coverage.

3. The method as claimed in claim 2, wherein the difference between said speed of said vehicles and said time interval are determined so that the spacing of said reflection positions are at most equal to one-half of the spacing between said separate receivers.

4. The method as claimed in claim 1, wherein a single reception device is used comprising a larger number of separate receivers.

5. The method as claimed in claim 1, wherein several reception devices are used which are moved by several second vehicles which travel successively away from said first vehicle moving the seismic source.

6. The method as claimed in claim 1, wherein at least a part of said first and second vehicles is remote controlled from another vehicle.

7. The method as claimed in claim 6, wherein each remote controlled vehicle moves at least one reception assembly.

8. The method as claimed in claim 6, wherein each remote control vehicle moves at least one seismic source.

9. The method as claimed in claim 1, wherein said emission and reception cycles are provided by associating at least one source with a first vehicle moving obliquely with respect to a fixed direction alternately on one side and on the other side of said fixed direction.

10. The method as claimed in claim 1, wherein the difference between said unequal speeds of each source and each reception device over the advancing direction thereof and the time interval between two successive emission and reception cycles are determined so that the ratio between the longitudinal projections on a common line of the spacings of said reflection positions from the reflecting layers, which depends on said speeds and time intervals between any two successive cycles, and the spacing between separate receivers of the reception device is predetermined.

* * * * *